Patented Oct. 12, 1937

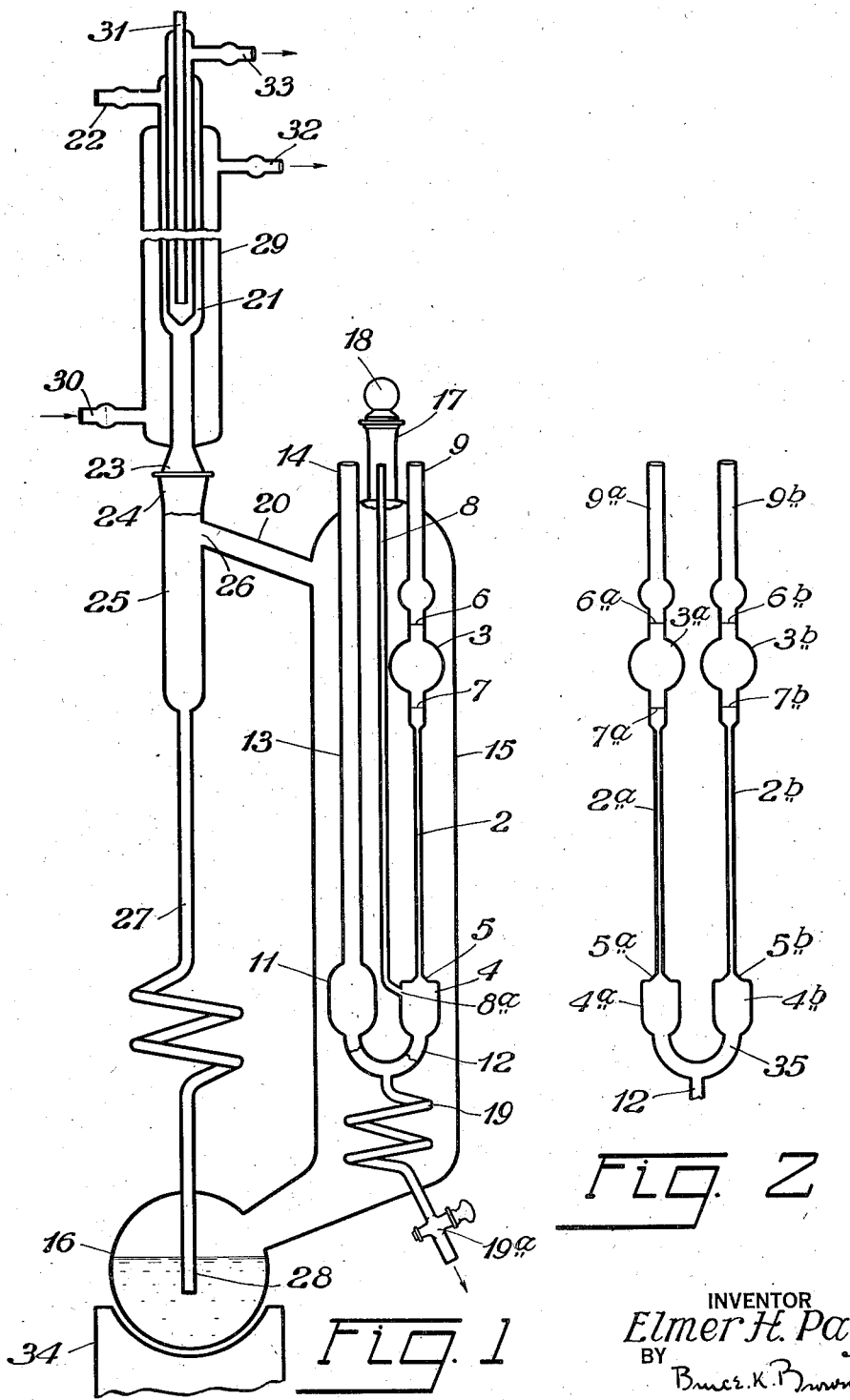

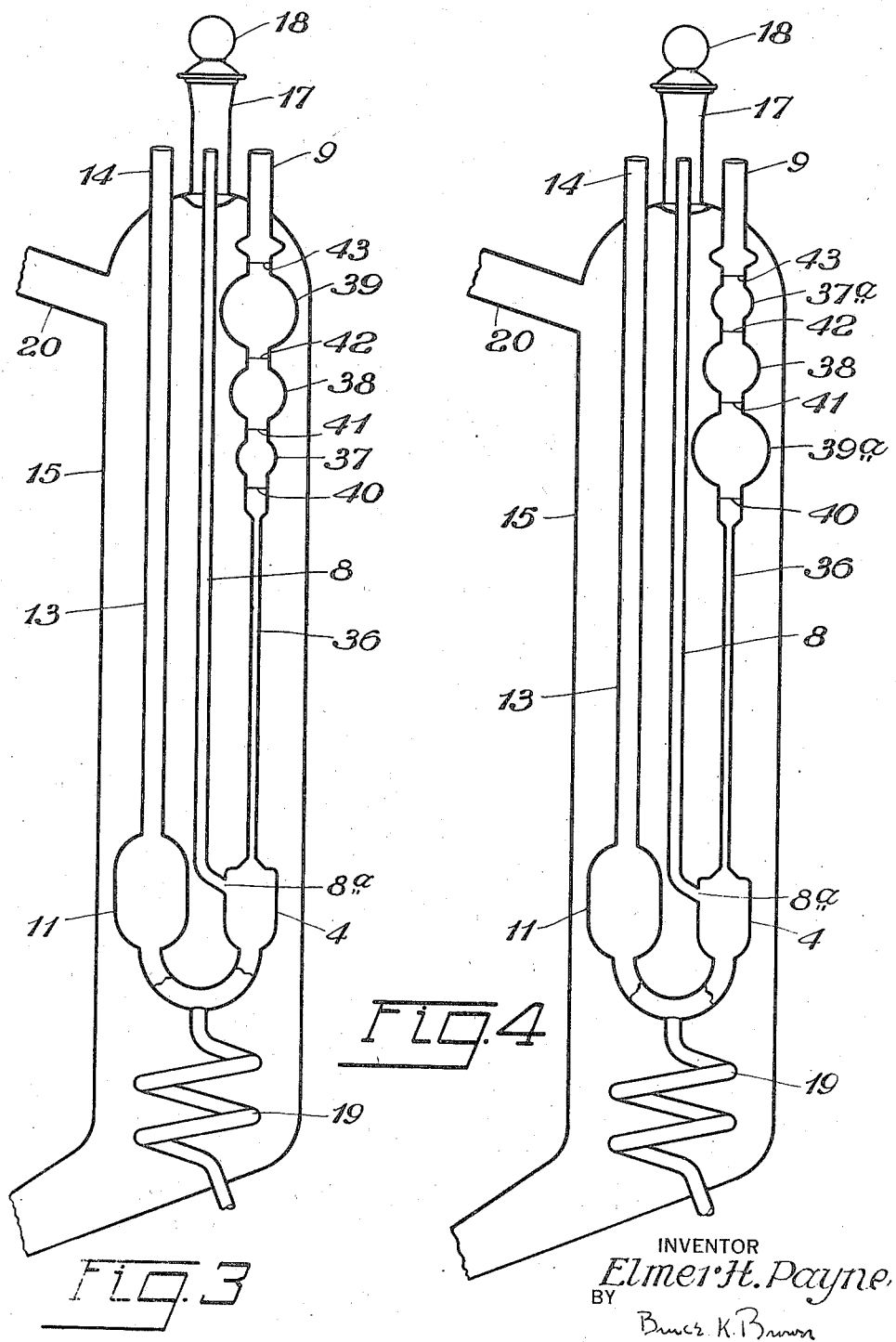

2,095,282

UNITED STATES PATENT OFFICE 2,095,282

CAPILLARY VISCOMETER

Elmer H. Payne, Wood River, Ill., assignor to Standard Oil Company, Chicago, Ill., a corporation of Indiana Application March 15, 1935, Serial No. 11,309

7 Claims. (Cl. 265—11)

This invention relates to improvements in capillary viscometers and more particularly to viscometers employing "suspended level" capillaries.

I am aware that capillary viscometers incorporating a "suspended level" have heretofore been used and it is therefore an object of my invention to provide an improved "suspended level" capillary viscometer with which extreme accuracy in viscosity determinations may be obtained by relatively simple manipulation.

Another object is to provide a capillary viscometer wherein the relatively delicate capillary tube, or tubes, and the associated glass elements are so arranged as to minimize breakage during normal use.

Another object is to provide a viscometer, as described, that will permit of the making of a plurality of determinations of the liquid to be tested in rapid succession, thereby to facilitate the testing of liquids of unknown viscosities and to provide an ultimate determination based upon the most favorable flow conditions through the capillary tube.

Another object is to provide an improved capillary viscometer incorporating a means by which the liquid to be tested is maintained at a constant temperature throughout the entire time during which the viscosity determination, or determinations, are being made.

Other objects, the advantages and uses of the invention will become apparent after reading the following specification and claims and after consideration of the drawings forming a part of the specification wherein:

Fig. 1 is a diagrammatic view of a capillary viscometer constructed according to my invention;

Fig. 2 is a fragmentary view of another form of the capillary tube assembly of the viscometer of Fig. 1; and Figs. 3 and 4 are views similar to Fig. 1 illustrating other forms of the viscometer, the condenser assembly and liquid heater bulb being omitted.

In the drawings I have selected for illustration, in Fig. 1, a single tube capillary viscometer, such as may be used for determining the viscosity of viscous petroleum liquids. The viscometer, as shown, comprises, in general, a substantially unitary glass assembly with the exception of the condenser unit which may be removably connected with the upper end of the vapor pressure control tube. While the several parts of the viscometer proper are illustrated as formed in a single glass unit it should, of course, be understood that the parts may be formed separately if desired and connected or joined to one another in any suitable manner.

With reference to Fig. 1, the instrument may comprise an upright capillary 2 having a feeder bulb 3 at its upper end and communicating at its lower end with a drop-level bulb 4. The "suspended level" of fluid descending through the capillary is established at the mouth of the diverging wall portion 5 of the capillary where it joins the drop-level bulb 4. Since the formation of the "suspended level" is well known to those skilled in the art, I have deemed it unnecessary to illustrate the capillary orifice in detail herein. Hair lines 6 and 7 adjacent to the upper and lower ends of the feeder bulb 3 are provided so that the observer may determine accurately the quantity of reserve liquid within the feeder bulb which is permitted to pass through the capillary, the time during which such passage takes place being a factor of the viscosity determination equation.

Vent tube 8 joins the drop-level bulb 4 at a point 8a adjacent to the upper end of the drop-level bulb and may extend upwardly to a point outside the jacket 15. A liquid receiving bulb 11 communicates through a U tube 12, at its lower end, with the lower end of the drop-level bulb 4. The receiving bulb may have an upwardly extending tubular portion 13 which also extends outside the jacket 15 and serves to add or remove oil, flush and clean the apparatus, etc. The bulb 11 may perform the two-fold function of receiving the liquid to be tested prior to its transfer to the feeder bulb 3 and also may serve to receive a thermometer introduced into the interior of the portion 13, by means of which the temperature of the oil to be tested may be ascertained.

A vapor jacket 15 surrounds the parts thus far described with the exception of the upper ends of the tubes 8, 9, and 14, and terminates at its lower end in a vapor-producing liquid-containing bulb 16, which bulb is preferably located at one side of the longitudinal axis of the jacket. A neck 17 normally closed by a stopper 18 is located at the upper end of the jacket 15 at one side of the central axis thereof through which the vapor-producing liquid may be admitted or withdrawn, and to facilitate cleansing the jacket. A thermometer may be inserted through opening 17 to indicate the temperature of the vapors. For purposes of draining the liquid to be tested from the viscometer assembly, subsequent to operation thereof, a drain tube 19 is provided which communicates with the base of the U-tube 12 and terminates in a stop-cock 19a located externally of the vapor jacket 15. I prefer to form the drain tube 19 in the shape of a spiral so that while it is free to lend support to the lower end of the relatively fragile internal assembly within the viscometer jacket no harm to these parts may take place by strains due to thermal expansion or contraction of the drain tube or of the capillary tube assembly. This tube may also be used for filling the capillaries, if desired, by applying suction to the open ends 9 and 14, closing tube 8 with the fingers. Tube 13 and bulb 11 may, if desired, be dispensed with, the liquid sample being drawn directly into the capillary through tube 19.

In order that the temperature within the vapor jacket 15 may be maintained at a predetermined level with minimum fluctuation, I prefer to employ liquid within the bulb 16 that has a boiling point approximating the temperature under which it is desired to conduct the viscosity test. Under such conditions I may adjust the pressure within the jacket 15 by an internal pressure regulating device communicating with the interior of the jacket through a tube 20 which in turn may communicate through the medium of the water condenser tube 21 with an orifice at 22. The orifice at 22 is intended to be connected directly with a pressure regulating device. Since such devices are well known to persons skilled in the art to which my invention pertains, I have refrained from illustrating the same in this application.

If desired, the condenser unit may be detachably connected with the viscometer unit proper by providing at the lower end of condenser tube 21 a ground glass wall portion 23 adapted to be received within a complementary ground glass portion 24 of an upright tubular member 25 communicating at 26 with the member 20 and terminating at its lower end in a liquid return tube 27 extending downwardly as indicated at 28 into the liquid within the bulb 16.

The condenser 29 surrounding the condenser tube 21 may be of the conventional type including water inlets 30 and 31, and water outlets 32 and 33 respectively. Thus the vapors from the jacket 15 may be condensed within the condenser 29 and returned through the tubular members 25 and 27 to the bulb 16 thereby to retain substantially all of the vapor producing liquid within the vapor-liquid system of the instrument.

In operation the instrument may be prepared by passing proper cleaning or flushing fluid through the flushing tube 13, a portion of which may, if desired, be drawn up through the capillary tube 2 and thereafter returned by blowing through a rubber hose connected with the portion 9 of the capillary tube assembly. The flushing liquid may be drained through the drain tube 19 upon opening the stop-cock 19a. Thereafter liquid to be tested may be admitted to the receiving bulb 11 through the tubular portion 13 thereof until the bulb is filled. At this time the heater, indicated at 34, below the bulb 16, may be placed in operation and a thermometer lowered through the tube 13 into the liquid in the bulb 11. When the temperature of the liquid in the bulb 11 has arrived at the proper value selected for viscosity determinations the operator may close vent tube 8 by placing his finger upon the upper end thereof and apply suction, as through a rubber hose attached to the neck 9 of the feeder bulb assembly. This procedure will cause the liquid to be drawn upwardly through the drop-level bulb 4 through the capillary 2 and into the feeder bulb 3. The liquid should be drawn to a level above the hair line 6. The level of liquid may be thus maintained by holding the fingers upon the upper ends of the tubes 8 and 13 until the rubber tube is disconnected from the neck 9 of the capillary tube and feeder bulb assembly. Thereafter by removal of the fingers from the tubes 8 and 13 the liquid may pass downwardly from the feeder bulb 3 through the capillary bore of the tube 2 and into the drop-level bulb 4, the time during which the liquid meniscus passes from the hair line 6 to the hair line 7 being measured. Taken with the temperature at which the test is conducted, together with the flow characteristics of the capillary bore, this provides factors for the viscosity determination equation.

After the test has been conducted the liquid may be readily removed by opening the stop-cock 19a, at which time the instrument may be prepared for future tests.

In Fig. 2 I have illustrated another form of the capillary tube assembly wherein the bores of the capillary tubes 2a and 2b are of different diameters, each terminating in a drop-level bulb 4a and 4b respectively, connected with one another through a U-tube 35 which in turn may be connected with the U-tube 12. For purposes of simplicity I have not illustrated the vent tubes although these tubes may be incorporated in the assembly in the manner indicated in Fig. 1, one with each of the drop-level bulbs 4a and 4b. The advantage of this multiple tube arrangement is that when liquids, the approximate viscosity of which is unknown, are to be tested, determinations in quick succession performed by drawing the same liquid separately into the feeder bulbs 3a and 3b may be carried out and that one of the readings which is most favorable for accurate calculation employed.

If the liquid is particularly viscous the tube 2b having the larger capillary bore would be the one used. If the liquid is relatively thin and of low viscosity the tube 2a having the smaller capillary bore would be preferred. While I have indicated in Fig. 2 a multiple capillary tube assembly in which two tubes are illustrated it should be understood that the number of capillary tubes may be increased as desired, although for most practical purposes, and particularly in instances where the instrument is to be used for liquids of a fairly narrow range of viscosity two such capillary tubes may be sufficient. If desired, both capillaries may terminate in the same drop-level bulb which is connected to the atmosphere by a single vent tube.

In Fig. 3 I have illustrated a modification of the capillary tube assembly which possesses the advantages of the multiple capillary tube assembly of Fig. 2 but which necessitates the use of but one capillary tube 36. This tube may be constructed with a plurality of feeder bulbs 37, 38, and 39 in series array at the upper end thereof, hair-lines 40, 41, 42, and 43 being provided for the purpose of determining flow of the liquid per unit of time into the capillary 36. The feeder bulbs 37 to 39 inclusive are of increasing capacity in a direction away from the capillary 36. Thus the bulb 39 may have eight times the capacity of the bulb 37 and the bulb 38 four times the capacity of the bulb 37. All other parts of the apparatus may be constructed precisely as described in connection with the viscometer of Fig. 1.

In use, for the determination of a liquid having relatively low viscosity the liquid may be drawn from the bulb 11 upwardly through the capillary so as to fill the bulbs 37, 38, and 39 to a point above the hair lines 43. The time during which the liquid passes from the hair line 43 to the line 42 may be employed as the time factor of the equation, the volume of the bulbs being known. Or bulbs 37 and 38 may be filled to a point above line 42 and the time during which the liquid passes from the hair line 42 to the line 40 employed as the time factor of the equation. If the liquid has a very low viscosity it may be preferable to take as the time factor of the equation the time during which the liquid passes from the hair line 43 to the hair line 40. When the liquid is relatively heavy and has a high viscosity then the bulb 37 alone may be used.

In Fig. 4 I have shown another form of the multiple bulb single tube capillary wherein the order of the tubes as to capacity relative to the upper end of the capillary 36 is reversed, the smaller, or tube 37a, being at the top and the larger bulb 39a being at the bottom.

While I have presented herein certain embodiments of my invention by description and illustration of the detailed structure thereof, it is to be understood that such disclosure is for the purpose of illustration only and that the scope of my invention is to be limited only by the appended claims.

I claim:

1. A viscometer comprising, in combination, an upright capillary tube terminating in its lower end in a vented drop-level bulb and having a vented feed bulb at its upper end, a receiving bulb located adjacent to the drop-level bulb and having communication with the lower end of the drop-level bulb, said receiving bulb having a liquid capacity greater than said capillary tube, said drop-level bulb and said feed bulb, a filling tube communicating with the upper end of the receiving bulb and extending upwardly in parallel relationship with said capillary tube, a vapor chamber enclosing said capillary tube, said feeder bulb, said drop-level bulb, and said receiving bulb, said vapor chamber having an enlarged liquid space in its lower end off-set from the longitudinal axis of the vapor chamber for containing liquid to produce vapor when heated to its boiling point, means for controlling the boiling point of said liquid, means for removing vapors from said vapor chamber, means for condensing said vapor and returning the condensate to said liquid space and a valved spiral tube extending downwardly from said receiving bulb to a point external of said vapor chamber.

2. A viscometer comprising, in combination, a plurality of upright capillary tubes of different capillary bores, means providing a common vented liquid receiving space communicating with the lower ends of said capillary tubes, each of said capillary tubes having a feed bulb at its upper end said feed bulb having an elongated neck, and means including a receiving bulb having a liquid capacity greater than any one of said capillary tubes and its associated said feeder bulb and communicating with said liquid receiving space, a filling tube communicating with the receiving bulb and extending upwardly in parallel relationship with said capillary tubes, venting means for maintaining equal pressure in said feeder bulbs and said receiving bulb, a vapor chamber enclosing all of said capillary tubes with their respective feed bulbs, said receiving bulb and the major portion of said filling tube and said elongated neck of said feeder bulbs, said vapor chamber having an enlarged liquid space in its lower end off-set from the longitudinal axis of the vapor chamber for containing liquid to produce vapor when heated to its boiling point, means for controlling the boiling point of said liquid, means for removing vapors from said vapor chamber, means for condensing said vapor and returning the condensate to said liquid space and a valved spiral tube extending downwardly from said receiving bulb to a point external of said vapor chamber.

3. A viscometer comprising, in combination, an upright capillary tube terminating at its lower end in a vented drop-level bulb, a plurality of superposed serially connected feeder bulbs of different capacity at the upper end of said capillary tube, a receiving bulb located adjacent to the drop-level bulb and having communication with the lower end of the drop-level bulb, and a filling tube communicating with the upper end of the receiving bulb and extending upwardly in parallel relationship with said capillary tube.

4. Apparatus, as defined in claim 3, wherein the uppermost of the feeder bulbs has the greatest liquid capacity and the balance of the bulbs are of decreasing capacity in the direction toward the capillary tube.

5. An apparatus, as defined in claim 3, wherein the uppermost of the feeder bulbs has the smallest liquid capacity and the remainder of the bulbs are of increasing capacity in a direction toward the capillary tube.

6. A viscometer comprising, in combination, an upright capillary tube terminating at its lower end in a vented drop-level bulb, a plurality of superposed serially connected feeder bulbs of different capacity at the upper end of said capillary tube, a receiving bulb located adjacent to the drop-level bulb and having communication with the lower end of the drop-level bulb, a filling tube communicating with the upper end of the receiving bulb and extending upwardly in parallel relationship with said capillary tube, a vapor chamber enclosing said capillary tube, said feeder bulbs, said drop-level bulb, a major portion of said drop-level bulb vent tube, and a major portion of said filling tube, said vapor chamber having an enlarged liquid space in its lower end off-set from the longitudinal axis of the vapor chamber for containing liquid to produce hot vapor when heated to its boiling point, and means for controlling the boiling temperature of said liquid.

7. A viscometer comprising, in combination, an upright capillary tube terminating at its lower end in a vented drop-level bulb, a plurality of superposed serially connected feeder bulbs of different capacity at the upper end of said capillary tube, a receiving bulb located adjacent to the drop-level bulb and having communication with the lower end of the drop-level bulb, a filling tube communicating with the upper end of the receiving bulb and extending upwardly in parallel relationship with said capillary tube, a vapor chamber enclosing said capillary tube, said feeder bulbs, said drop-level bulb, a major portion of said drop-level bulb vent tube, and a major portion of said filling tube, said vapor chamber having an enlarged liquid space in its lower end off-set from the longitudinal axis of the vapor chamber for containing liquid to produce hot vapor when heated to its boiling point, means for controlling the boiling temperature of said liquid, means for removing the vapors from said vapor chamber, means for condensing the vapors removed from said vapor chamber and means for returning the condensate to the liquid space of said vapor chamber.

ELMER H. PAYNE.